(12) United States Patent  
Tanji et al.

(10) Patent No.: US 6,732,969 B2  
(45) Date of Patent: May 11, 2004

(54) SEATBELT RETRACTOR

(75) Inventors: Hiromasa Tanji, Kyoto (JP); Koji Tanaka, Moriyama (JP)

(73) Assignee: Takata Corporation, Tokyo (JP)

( * ) Notice: Subject to any disclaimer, the term of this patent is extended or adjusted under 35 U.S.C. 154(b) by 172 days.

(21) Appl. No.: 09/993,893

(22) Filed: Nov. 27, 2001

(65) Prior Publication Data

US 2002/0066818 A1 Jun. 6, 2002

(30) Foreign Application Priority Data

Dec. 4, 2000 (JP) .......................... 2000-368006  
Jan. 10, 2001 (JP) .......................... 2001-002283

(51) Int. Cl.⁷ .............................................. B65H 75/48

(52) U.S. Cl. .................................................. 242/384.1

(58) Field of Search ............................. 242/384, 384.1; 280/806; 297/478

(56) References Cited

U.S. PATENT DOCUMENTS

| | | | | | |
|---|---|---|---|---|---|
| 3,740,000 | A | * | 6/1973 | Takada | 242/384 |
| 3,807,522 | A | * | 4/1974 | Becker | 242/384 |
| 4,088,864 | A | * | 5/1978 | Theeuwes et al. | |
| 4,261,530 | A | * | 4/1981 | Asai et al. | 242/384 |
| 4,280,584 | A | * | 7/1981 | Makishima | 242/384 |
| 4,856,728 | A | * | 8/1989 | Schmidt et al. | 242/384.1 |
| 5,484,190 | A | * | 1/1996 | Corrion et al. | 297/478 |
| 5,669,573 | A | * | 9/1997 | Hirzel | 242/384.1 |
| 5,775,620 | A | * | 7/1998 | Jabusch et al. | 242/384.1 |
| 6,213,420 | B1 | * | 4/2001 | Kopetzky | 242/384 |

* cited by examiner

*Primary Examiner*—William A. Rivera  
(74) *Attorney, Agent, or Firm*—Kanesaka & Takeuchi

(57) ABSTRACT

In a seat belt retractor, when a collision predicting signal is generated from a collision predicting device, a motor rotates counterclockwise, and a pawl is thereby raised via a lever so as to move to a position contacting saw-blade teeth of a ratchet gear. In this state, when a rotational force is applied in the seatbelt-extraction direction, the rotation is prevented. On the other hand, the rotation in the seatbelt-retraction direction can be performed by pushing down the pawl with a diagonal portion of the saw-blade tooth of the ratchet gear.

11 Claims, 11 Drawing Sheets

Fig. 1(A)
Fig. 1(B)
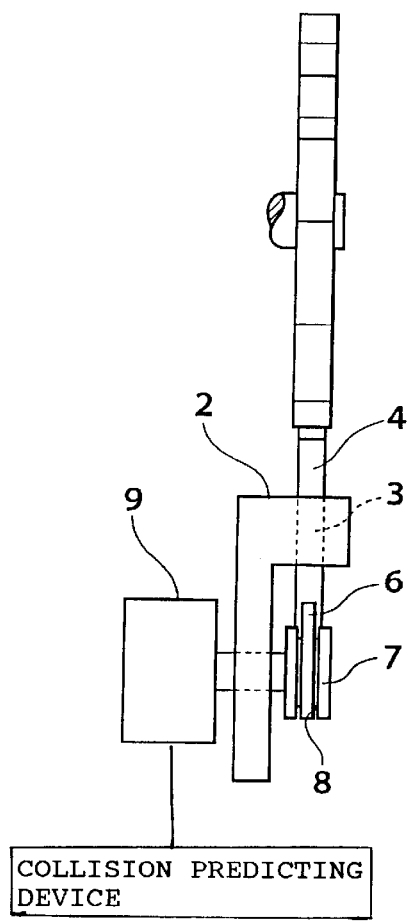
COLLISION PREDICTING DEVICE
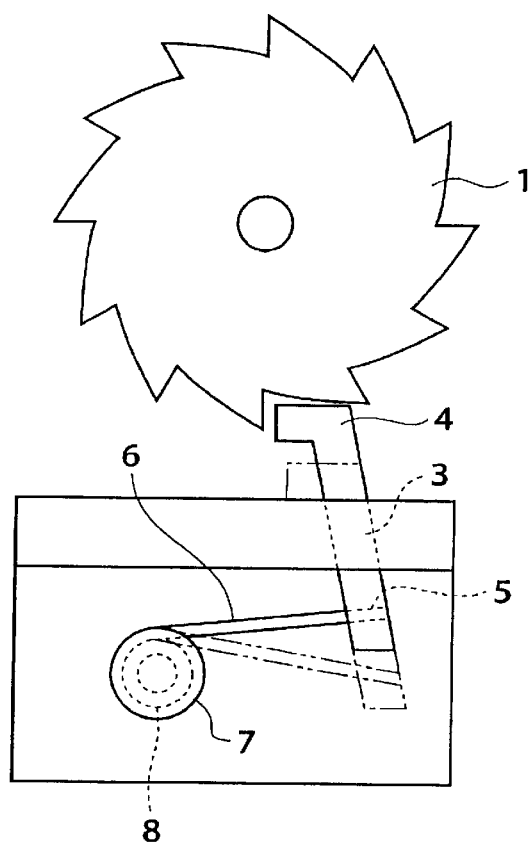

SEATBELT RETRACTOR

BACKGROUND OF THE INVENTION AND RELATED ART STATEMENT

The present invention relates to a seatbelt retractor for use in a passenger car, etc., in order to ensure the safety of a vehicle occupant.

The seatbelt retractor must be installed in order to ensure the safety of a vehicle occupant upon an accident, such as a passenger car collision, and various types thereof have been developed. An example of the simplest structure thereof is shown in FIG. 11.

A spring cover 21, which is a supporter at one side of the seatbelt retractor, is provided with a bearing 21a arranged therein, into which a shaft 22a of a spool 22 is fitted so as to rotate while an urging force in the retracting direction is applied to the shaft 22a by a spring. Around the spool 22, a seatbelt is wound.

Inside the spool 22, a concave fitted portion (not shown) is formed, into which one end of a torsion bar 23 is fitted. The other end of the torsion bar 23 is fitted into a concave fitted portion (not shown) formed in a locking base 24. A shaft 24a of the locking base 24 passes through a hole 25a of a lock gear 25 so as to fit into a bearing (not shown) of a retainer 26, which is a supporter in the other side of the seatbelt retractor.

Such a mechanism results in supporting the spool 22 at its rotating shaft by the spring cover 21 and the retainer 26, and rotating the spool 22 so as to retract the seatbelt by means of the urging force of the spring. The spring cover 21 and the retainer 26 are fixed at both ends of a base frame 28, so that the spool 22 is accommodated within the base frame 28.

In these structural elements, the locking base 24 and the lock gear 25 are relatively rotatable by a predetermined angle, so that the lock gear 25 is urged by a spring 29 relative to the locking base 24 in the direction of extracting the seatbelt so as to approach the limit of the relative rotation.

When the seatbelt is extracted in a normal state, since there is no rotational resistance against the lock gear 25, the lock gear 25 can not overcome the urging force of the spring 29 to thereby rotate integrally with the locking base 24.

Even when the locking base 24 is rotated in the retracting direction as the spool 22 is rotated by the spring force, the lock gear 25 rotates integrally with the locking base 24 because the lock gear 25 is designed originally to approach the limit of the rotation relative to the locking base 24 in this direction as mentioned above.

When rapid extraction of the seatbelt is produced due to a collision or the like, a flywheel 30 accommodated within the lock gear 25 is displaced by overcoming the urging force of a spring 31, so that the lock gear 25 can not rotate relatively to the retainer 26 and the rotation is stopped.

Then, the rocking base 24 rotates relatively to the lock gear 25 against the urging force of the spring 29. A mechanism is constructed such that a pawl 32 accommodated in the locking base 24 protrudes outside by this relative rotation, and a gear of the externally protruded pawl 32 is brought into engagement with a gear section 28a formed in the base frame 28, thereby also stopping the rotation of the locking base 24.

Accordingly, rotation of the torsion bar 23 is also stopped and the spool 22 is allowed to rotate only by an angle corresponding to a twist of the torsion bar 23. Therefore, the spool 22 is thereafter rotated under a tension increasing as the seatbelt is extracted. The locking mechanism described above is generally called as "a locking mechanism by a webbing sensor".

The description above only illustrates an outline of the seatbelt retractor and there are complex mechanisms for use as a mechanism for stopping rotation of the lock gear 25 by the movement of the flywheel 30 and a mechanism for protruding the pawl 32 outside, for example. However, the seatbelt retractor is known and is used in common, so that more detailed description may be not necessary for those skilled in the art. Moreover, it is irrelevant to the principal part of the present invention, so that the more detailed description is omitted.

However, in the conventional seatbelt retractor, since the lock mechanism is operated after the seatbelt is actually extracted rapidly, a time lag for operating the lock mechanism may be developed. When the seatbelt is suddenly extracted during wearing the seatbelt, the lock mechanism may also be operated, so that uncomfortable feeling or unpleasantness may be given to an occupant.

The present invention has been made in view of such a situation, and it is an object of the present invention to provide a seatbelt retractor which can promptly operate a lock mechanism upon an emergency, and moreover, it is another object to provide a seatbelt retractor which does not provide uncomfortable feeling or unpleasantness to the occupant due to locking produced when the seatbelt is extracted for wearing the seatbelt.

SUMMARY OF THE INVENTION

First means for solving the problems described above is a seatbelt retractor comprising a mechanism for locking the rotation in the extracting direction of the seatbelt retractor upon receiving a collision predicting signal from a collision predicting device, the mechanism being independent of the rotational movement of a spool (first aspect of the invention).

The collision predicting device detects a vehicle acceleration, a distance to a front car, a vehicle velocity, hard braking by the driver, and so forth so as to predict an accident such as a collision prior to occurrence of the accident on the basis of the detected information, and the device is already known. In the first means, at the time when receiving a collision predicting signal from the collision predicting device, rotation of the seatbelt retractor in the extracting direction is locked. Therefore, differently from a conventional retractor, extraction of the seatbelt can be locked before the seatbelt is actually extracted, so that operation cannot lag behind.

In addition, in this case, the phrase "locking rotation in the extracting direction" means completely locking actual rotation including locking while allowing the rotation via the torsion bar mentioned in the description of the related art.

Also, if removing the extraction-locking mechanism by detecting extracting the seatbelt using the flywheel mentioned in the description of the related art, even when rapidly extracting the seatbelt during wearing the seatbelt, the seat belt is not locked and thereby eliminating uncomfortable feeling or unpleasantness from an occupant.

In the second means for solving the problems, according to the first means, the mechanism for locking the rotation in the extracting direction of the seatbelt retractor comprises a ratchet gear having saw-blade teeth for use in a ratchet mechanism at the external periphery and directly connected to a rotational shaft of the seatbelt retractor or engaged with a gear directly connected to the rotational shaft, a pawl arranged to be engageable with the saw-blade teeth, a lever for driving the pawl so as to engage with and disengage from the saw-blade teeth, a rotational body for driving the lever via a torque limiter, and a motor for driving the rotational body (second aspect of the invention).

In the second means, in a steady state, the rotational position of the motor is located at a position that the pawl is not engaged with saw-blade teeth of the ratchet gear. Upon receiving a collision predicting signal, the motor rotates, and the rotational body is thereby rotated. The lever is thereby driven so as to drive the pawl to a position engaging with the saw-blade teeth of the ratchet gear. Therefore, the pawl and the ratchet gear form a ratchet mechanism, so that the ratchet gear can rotate in the seatbelt-retraction direction while cannot rotate in the extracting direction. Accordingly, the rotational shaft of the seatbelt retractor directly connected to the ratchet gear or connected thereto via a gear is also prevented from rotating in the extracting direction.

In this case, although the motor continues to rotate, because the torque limiter is arranged between the rotational body and the lever, a force for pushing the pawl by the ratchet gear is limited to a force determined by the torque limiter, so that rotation of the ratchet gear in the direction retracting the seatbelt cannot be prevented and the lever, etc. cannot be damaged.

In the third means for solving the problems, according to the first means, the mechanism for locking the rotation in the extracting direction of the seatbelt retractor comprises a ratchet gear having saw-blade teeth for use in a ratchet mechanism at the external periphery and directly connected to a rotational shaft of the seatbelt retractor or engaged with a gear directly connected to the rotational shaft, a pawl arranged to be engageable with the saw-blade teeth, a lever for driving the pawl so as to engage with and disengage from the saw-blade teeth, a rotational body for driving the lever, and a motor having a torque limiter for driving the rotational body (third aspect of the invention).

The third means is different from the second means only in using the motor having the torque limiter instead of the torque limiter between the lever and the rotational body. Because other mechanisms are identical, the fundamental operation and advantages thereof are the same as those of the second means. In the third means, since a standard motor having the torque limiter is used, any torque limiting mechanism is not specifically required. In addition, the torque limiter of the motor may be a limiter for limiting the maximum current value other than a mechanical one.

In the fourth means for solving the problems, according to the first means, the mechanism for locking the rotation in the extracting direction of the seatbelt retractor comprises a ratchet gear having saw-blade teeth for use in a ratchet mechanism at the external periphery and directly connected to a rotational shaft of the seatbelt retractor or engaged with a gear directly connected to the rotational shaft, a pawl which is arranged to be engageable with the saw-blade teeth and which rotates about a rotational pivot arranged in a fixed part of the seatbelt retractor, and a driving mechanism for driving the pawl so as to engage with and disengage from the saw-blade teeth via an elastic body (fourth-aspect of the invention).

In the fourth means, in a steady state, the position of the pawl driven by the driving device is located at a position that the pawl is not engaged with saw-blade teeth of the ratchet gear. Upon receiving a collision predicting signal, the driving device operates, and the lever is thereby driven via the elastic body so as to rotate the pawl to a position engaging the saw-blade teeth of the ratchet gear. Therefore, the pawl and the ratchet gear form a ratchet mechanism, so that the ratchet gear can rotate in the direction retracting the seatbelt while cannot rotate in the extracting direction. Accordingly, the rotational shaft of the seatbelt retractor directly connected to the ratchet gear or connected thereto via a gear is also prevented from rotating in the extracting direction.

In this case, because the elastic body is arranged between the driving device and the lever, a force of the ratchet gear for rotating in the direction retracting the seatbelt is absorbed by the elastic body so as not to prevent the rotation.

In the fifth means for solving the problems, according to the first means, the mechanism for locking the rotation in the extracting direction of the seatbelt retractor comprises a ratchet gear having saw-blade teeth for use in a ratchet mechanism at the external periphery and directly connected to a rotational shaft of the seatbelt retractor or engaged with a gear directly connected to the rotational shaft, a pawl which is arranged to be engageable with the saw-blade teeth by rotation and which has a slotted hole fitted with a pin formed in a fixed part of the seatbelt retractor, and a ratchet lever which is arranged to be connected to a reciprocation driving unit and has a rotational pivot of the pawl, wherein when the reciprocation driving unit is located at a first position, the pawl rotational pivot of the ratchet lever is located at the first position while the pin is located at one end of the slotted hole so that the pawl is positioned apart from the ratchet gear, and wherein when the reciprocation driving unit is located at a second position, the pawl rotational pivot of the ratchet lever is located at the second position so that the pawl is located at an engageable position with the ratchet gear, and when the spool is rotated in the extracting direction at this state, the pawl rotates about the pawl rotational pivot so as to be stopped by abutment of the pin against the one end of the slotted hole so that rotation of the ratchet gear is stopped, while when the spool is rotated in the retracting direction, the pawl rotates about the pawl rotational pivot in the direction opposite to the aforementioned direction so that the rotation of the ratchet gear is allowed by positioning of the shaft at the other end of the slotted hole (fifth aspect of the invention).

In the fifth means, when the reciprocation driving unit is located at the first position, the pawl rotational pivot of the ratchet lever is located at the first position while the pin formed in the fixed part of the seatbelt retractor is located at one end of the slotted hole of the pawl. Thereby, the pawl is positioned apart from the ratchet gear so that the ratchet gear can rotate freely and rotation of the spool is not prevented.

When the reciprocation driving unit is located at the second position, the pawl rotational pivot of the ratchet lever is loss located at the second position so that the pawl is located at an engageable position with the ratchet gear. In this state, when the pin is located at the one end of the slotted hole of the pawl, the pawl is engaged with the ratchet gear while when the pin is located at the other end of the slotted hole, the pawl is not engaged with the ratchet gear.

When the spool rotates in the extracting direction, the pawl rotates about the pawl rotational pivot so as to prevent the ratchet gear from rotation by abutting of the pin against the one end of the slotted hole. Thereby, rotation of the spool is prevented.

When the spool rotates in the retracting direction, the pawl is pushed by the ratchet gear so as to rotate about the pawl rotational pivot in the direction opposite to the aforementioned direction, so that the pin is positioned at the other end of the slotted hole. In this case, the pawl is not engaged with the ratchet gear and rotation of the ratchet gear is allowed.

Sixth means for solving the problems, according to the fifth means further comprises an elastic body for urging the pawl in the rotational direction so as to bring the pawl into engagement with the ratchet gear (sixth aspect of the invention).

In the sixth means, since the pawl is urged by the elastic body in the rotational direction so as to bring the pawl into engagement with the ratchet gear, when the reciprocation driving unit is located at the second position and the ratchet gear rotates in the extracting direction, the rotation can be prevented by secure engagement between the ratchet gear and the pawl.

In the seventh means for solving the problems, according to the first means, having a mechanism for locking extraction of the seatbelt by detecting rapid extraction of the seatbelt (a locking mechanism by a webbing sensor), the mechanism for locking rotation in the extracting direction of the seatbelt retractor is a mechanism for actuating the locking mechanism by the webbing sensor) seventh aspect of the invention).

In the seventh means, the rotation in the extracting direction is locked by using the locking mechanism by the webbing sensor which is already assembled therein so that fewer additional instrument is required, thereby simplifying the structure.

BRIEF DESCRIPTION OF THE DRAWINGS

FIGS. 1(A) and 1(B) are schematic views of a first locking mechanism according to an embodiment of the present invention;

DETAILED DESCRIPTION OF PREFERRED EMBODIMENTS

Figure 11:
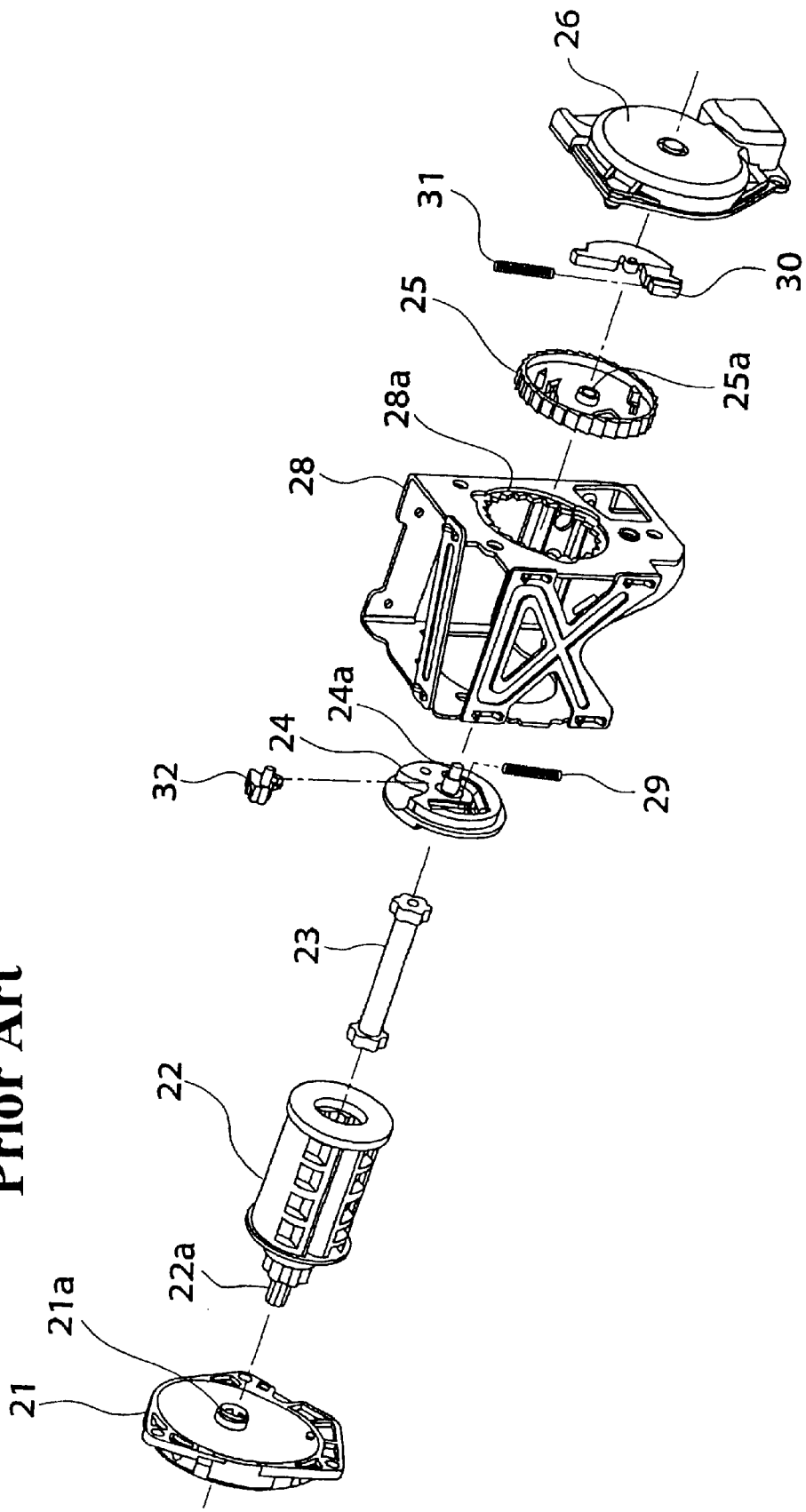
FIG. 11 is a schematic view illustrating an example of a seatbelt retractor.

Embodiments according to the present invention will be described below with reference to the drawings. The embodiments which will be described below have basic structures shown in FIG. 11, and only have differences in a mechanism added thereto for locking the rotation of the seatbelt retractor in the extracting or withdrawing direction when receiving a collision predicting signal from a collision predicting device. Thus, the description of the basic structure which is the same as the conventional one is omitted and the locking mechanism will only be described below.

FIGS. 1(A) and 1(B) are schematic views of a first locking mechanism according to an embodiment of the present invention. In FIGS. 1(A) and 1(B), numerals 1, 2, 3, 4, 5, 6, 7, 8, and 9 represent a ratchet gear, a supporting base, a through-hole, a pawl, a hole, a lever, a rotating body, a groove, and a motor, respectively.

The ratchet gear 1 may be fixed to the shaft 22a of the spool 22 or to the shaft 24a of the locking base 24. When the lock gear 25 can be used as it is, it may be used therefor. The ratchet gear 1 may also be connected to a gear, which is fixed to the shaft 22a of the spool 22 or to the shaft 24a of the locking base 24, via a gear train. In any case, the ratchet gear 1 results in rotating integrally with the spool 22 or rotating in conjunction therewith via the torsion bar 23. On the external periphery of the ratchet gear 1, saw-blade teeth used for normal ratchets are formed.

The supporting base 2 may be fixed to the base frame 28 or may be formed as a part of the base frame 28, and it is provided with the through-hole 3 formed in the part thereof. The key-shaped pawl 4 shown in the drawing is fitted into the through-hole 3 so as to be slidable along the through-hole 3. The pawl 4 is provided with a hole 5 into which the lever 6 which is an elastic body is fitted. The other end of the lever 6 is wound around the groove 8 formed in the rotating body 7 for about ¾ turn thereof so as to produce a frictional force between the lever 6 and the groove 8 by fastening the groove 8 with an elastic force of the lever 6. When a force exceeding the frictional force is applied between the lever 6 and the groove 8, slippage is generated between both parts. That is, these parts form a torque limiter. The rotating body 7 is rotated by the motor 9.

In a normal state, the pawl 4 and the lever 6 are located in positions shown by phantom lines, so that the pawl 4 can not mesh with the saw-blade teeth of the ratchet gear 1, enabling the seatbelt retractor to operate without any restriction from the mechanism shown in FIGS. 1(A) and 1(B).

When a collision predicting signal is generated from the collision predicting device, the motor 9 rotates counterclockwise when viewing FIG. 1(B), and the pawl 4 is thereby raised upwardly via the lever 6 so as to move to a position contacting the saw-blade teeth of the ratchet gear 1, as shown by solid lines in FIG. 1(B). In this state, slippage is generated between the lever 6 and the groove 8 of the rotational body 7, so that even when the motor 9 is rotating, the pawl 4 stops at that position.

In this state, when a rotational force is applied in the direction extracting the seatbelt, the ratchet gear 1 is going to rotate counterclockwise when viewing FIG. 1(B). However, because of the step portion of the saw-blade tooth of the ratchet gear 1 contacts the pawl 4 and the lateral movement of the pawl 4 is restrained by the through-hole 3, the ratchet gear 1 can not rotate eventually. On the other hand, the rotation in the direction retracting the seatbelt can be performed by pushing down the pawl 4 with a diagonal portion of the saw-blade tooth of the ratchet gear 1.

That is, the saw-blade teeth of the ratchet gear 1 and the pawl 4 form a ratchet mechanism. At this time, it is of course necessary that the force pushing the pawl down exceeds the frictional force between the lever 6 and the groove 8 of the rotating body 7, or the elasticity of the lever 6 allows the pawl 4 to be pushed down.

Figure 2:
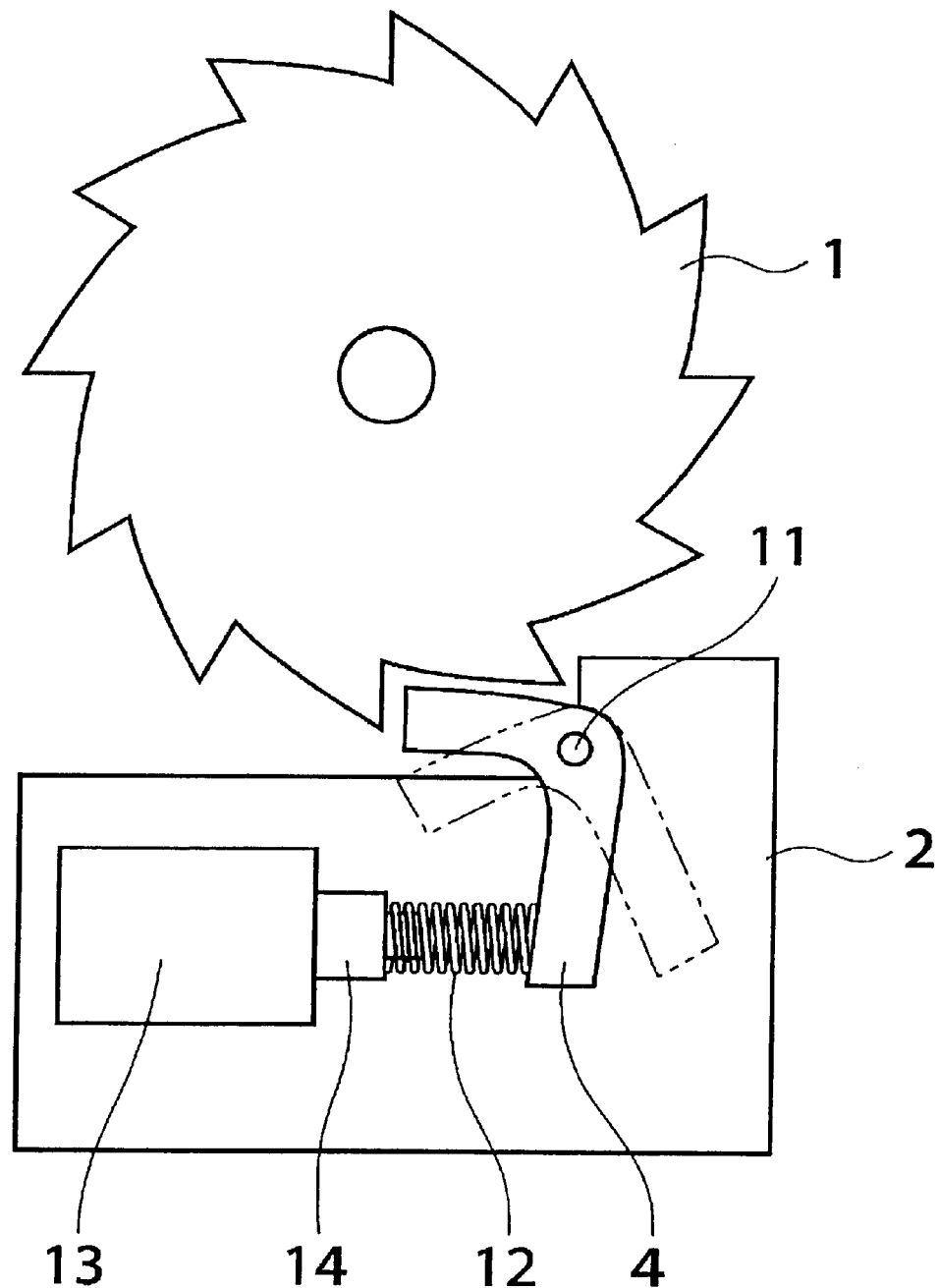
FIG. 2 is a schematic view of a second locking mechanism according to the embodiment of the present invention.

FIG. 2 is a schematic view of a second locking mechanism according to the embodiment of the present invention. In the drawings below, like reference numerals designate like elements common to those shown in the above drawings in the description of the embodiment, and the description thereof may be omitted. In FIG. 2, numerals 11, 12, 13, and 14 represent a rotational shaft, a spring member, a solenoid, and a piston of the solenoid, respectively.

In FIG. 2, the structure and arrangement of the ratchet gear 1 and the supporting base 2 are the same as those in FIGS. 1(A) and 1(B). The pawl 4, which is different from that shown in FIG. 1(B), has a shape of ^ as shown in the drawing, and is rotatable about the rotational shaft 11. One end of the pawl 4 is to engage the saw-blade teeth of the ratchet gear 1 while the other end is connected to the piston 14 of the solenoid 13 via the spring member 12.

In a steady state, the piston 14 of the solenoid 13 is extended, so that the pawl 4 is out of engagement with the saw-blade teeth of the ratchet gear 1 as indicated by a phantom line. Therefore, the locking mechanism shown in FIG. 2 does not cause any effect on the operation of the seatbelt retractor.

When a collision predicting signal is generated from the collision predicting device, the solenoid 13 is actuated so as to retract the piston 14. Therefore, via the spring member 12, the pawl 4 rotates clockwise about the rotational shaft 11, so that one end of the pawl 4 moves to a position touching the saw-blade teeth of the ratchet gear 1 as indicated by a solid line in FIG. 2.

In this state, when a rotational force is applied in the direction of extracting the seatbelt, the ratchet gear 1 tries to rotate counterclockwise when viewing FIG. 2. However, because a step portion of a saw-blade tooth of the ratchet gear 1 comes to contact the pawl 4 which is prevented from lateral movement by the rotational shaft 11, the ratchet gear 1 can not rotate eventually.

On the other hand, the rotation in the direction of retracting the seatbelt works, because a diagonal portion of the saw-blade tooth of the ratchet gear 1 pushes the pawl 4 down. Thus, the pawl 4 rotates counterclockwise about the rotational shaft 11 so as to enable the rotation. That is, the saw-blade teeth of the ratchet gear 1 and the pawl 4 form a ratchet mechanism. At this time, the force pushing the pawl 4 down is absorbed by the extension of the spring member 12.

Figure 3:
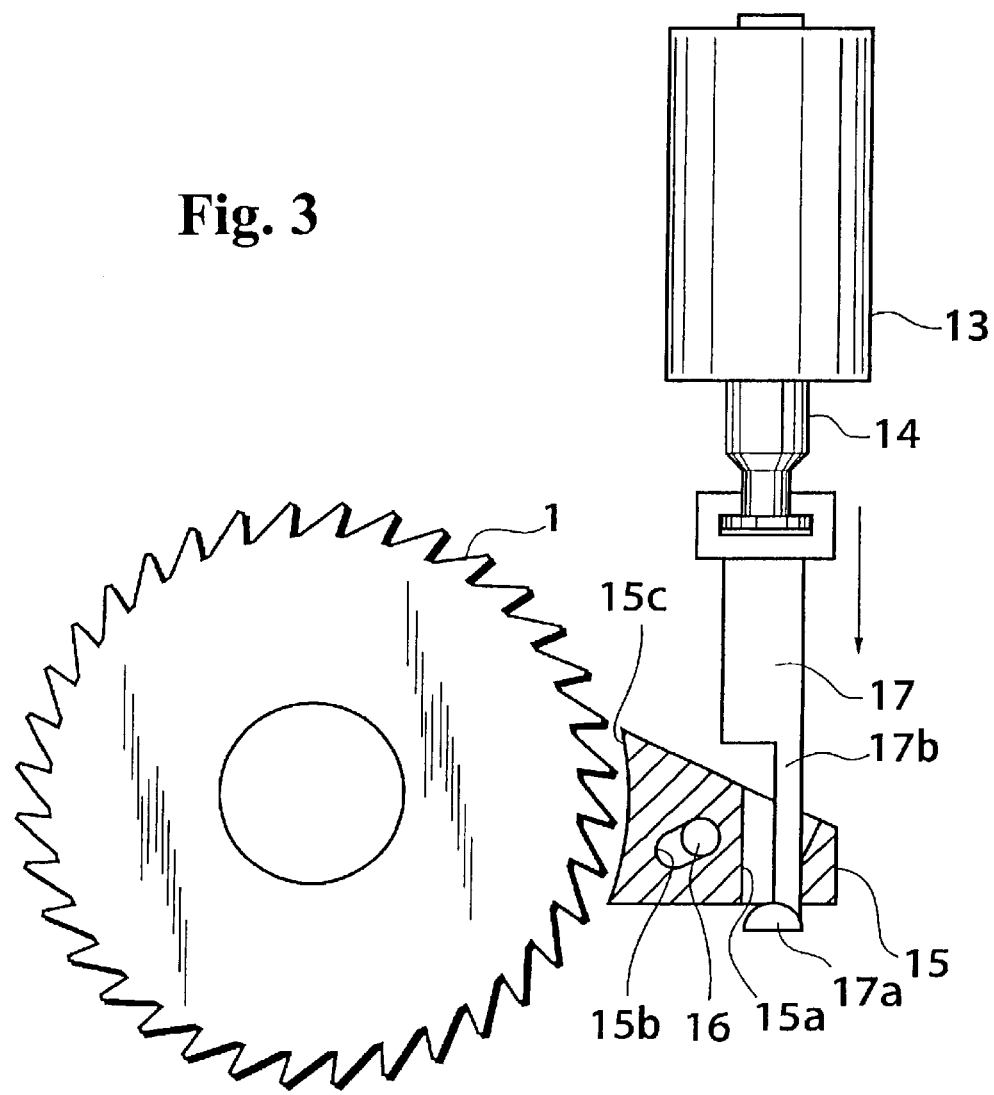
FIG. 3 is a schematic view illustrating a steady state of a third locking mechanism according to the embodiment of the present invention.
Figure 4:
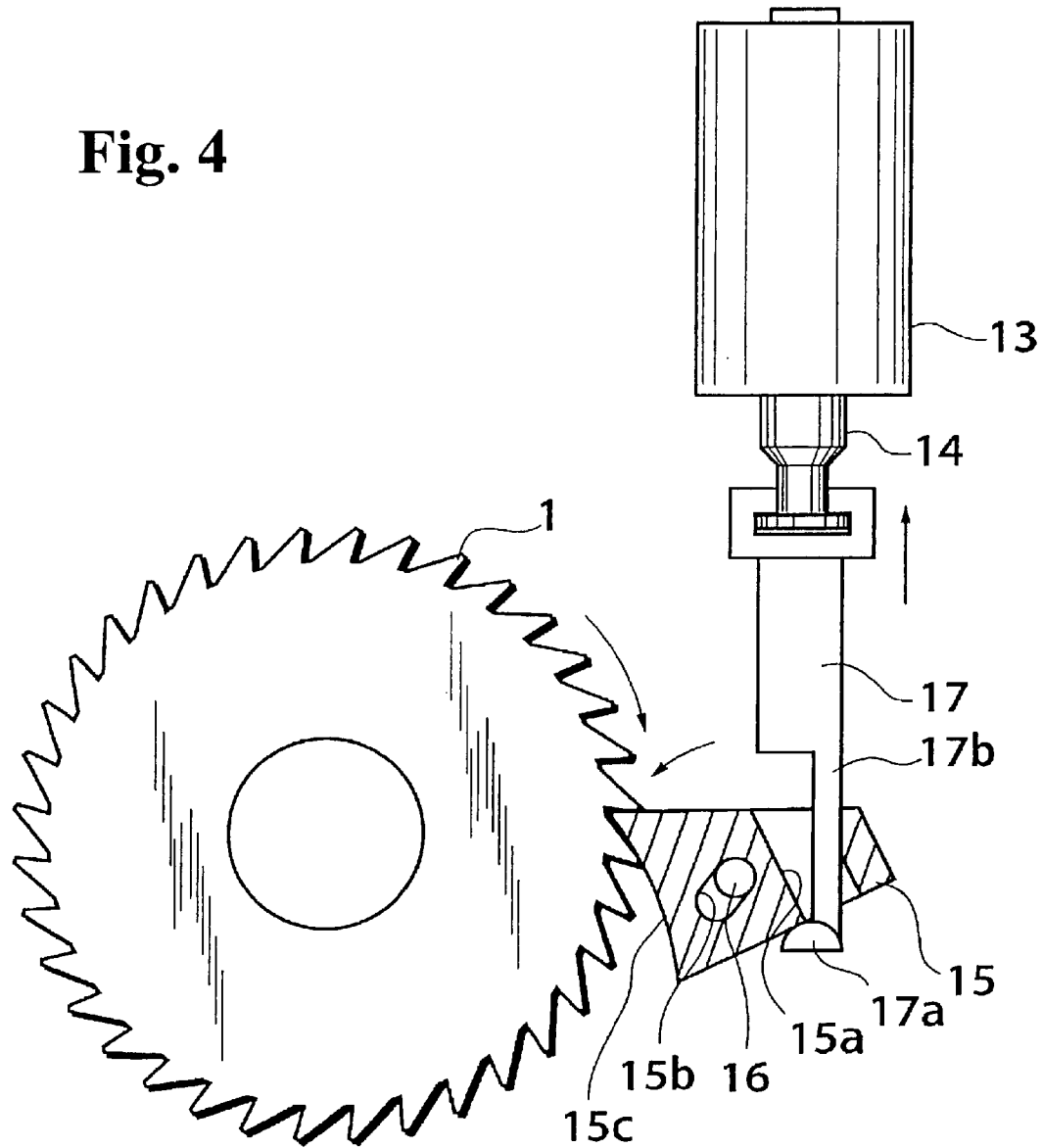
FIG. 4 is a schematic view illustrating a state that a spool is prevented from rotation in the seatbelt-extraction direction in the third locking mechanism according to the embodiment of the present invention.
Figure 5:
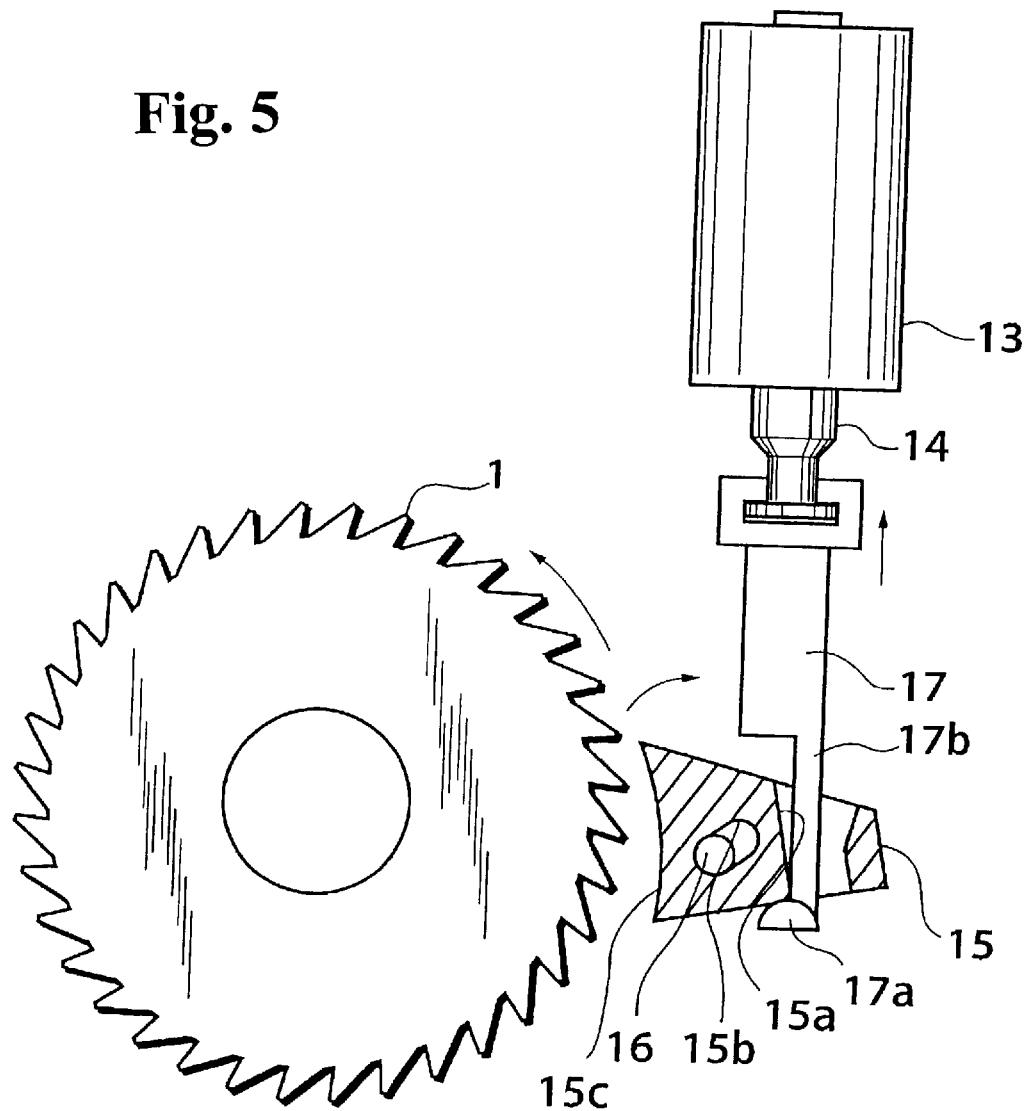
FIG. 5 is a schematic view illustrating a state that the spool is allowed to rotate in the seatbelt-retraction direction in the third locking mechanism according to the embodiment of the present invention.

FIGS. 3 to 5 are schematic views showing a third locking mechanism according to the embodiment of the present invention. In FIGS. 3 to 5, numerals 15, 15a, 15b, 15c, 16, 17, 17a, and 17b represent a pawl, a guide hole, a slotted hole, an engagement part, a supporting shaft, a ratchet lever, a rotating pivot part, and a diminution part, respectively. In these drawings, only the pawl 13 is shown in a sectional view.

FIG. 3 is a drawing showing a steady state in which the piston 14 of the solenoid 13 is extended. Therefore, the ratchet lever 17 is in a downwardly lowered state, and therefore, the pawl 15 supported by the rotating pivot part 17a is lowered down due to gravity, wherein an upper right portion of the slotted hole 15b abuts against the supporting shaft 16 arranged in a fixed part (retainer, for example), resulting in that the pawl 15 is supported by the supporting shaft 16 and the rotating pivot part 17a of the ratchet lever 17 to stop at the position shown in the drawing.

In this state, the engagement part 15c of the pawl 15 is separated from the teeth of the ratchet gear 1 which can rotate thereby freely. A diminution part 17b of the ratchet lever 17 contacts the right end of the guide hole 15a of the pawl 15. In addition, the guide hole 15a is larger in its diameter than the diminution part 17b as shown in the drawing, and especially in the upper part, it is enlarged at the upper right thereof. Therefore, to some extent, the pawl 15 can move laterally while can rotate about the rotating pivot part 17a.

When the piston 14 of the solenoid 13 is retracted from this state, the ratchet lever 17 is upwardly raised, as shown in FIG. 4. The pawl 15 is thereby raised while rotating counterclockwise so as to be engageable with the ratchet gear 1, as shown in the drawing. In this state, when the ratchet gear 1 rotates in the direction of extracting the seatbelt, i.e. clockwise as indicated by an arrow in the drawing, the tip of the engagement part 15c is brought into engagement with the teeth of the ratchet gear 1, so that the pawl 15 tries to rotate about the rotating pivot part 17a. However, because the upper right end of the slotted hole 15b abuts against the supporting shaft 16, the pawl 15 does not furthermore rotate. The rotation of the ratchet gear 1 is thereby stopped in this state, resulting in preventing the spool from rotation in the direction extracting the seatbelt.

On the other hand, when the spool is driven in the retracting direction in this state, a state shown in FIG. 5 is established. That is, when the ratchet gear 1 rotates counterclockwise, as indicated by an arrow in the drawing, the engagement part 15c of the pawl 15 is pushed by the teeth of the ratchet gear 1 so as to rotate clockwise about the rotating pivot part 17a against gravity, as indicated by an arrow in the drawing, and it comes to a state that the lower left side of the slotted hole 15b abuts against the supporting shaft 16. Therefore, in the retracting direction of the spool, the ratchet gear 1 can rotate freely. In addition, although the teeth of the ratchet gear 1 is depicted as being separated from the engagement part 15c of the pawl 15 in the drawing, the separation is made due to inertia of the pushing force of the ratchet gear, so that the teeth of the ratchet gear 1 will soon come to contact the engagement part 15c of the pawl 15 and can not be left separated therefrom because a counterclockwise rotational force due to gravity is normally applied to the pawl 15. Accordingly, when the ratchet gear 1 begins to rotate clockwise from the state shown in FIG. 5, the state shown in FIG. 4 is rapidly achieved.

As described above, when the piston 14 of the solenoid 13 is extended, the spool can rotate freely. On the other hand, when the piston 14 of the solenoid 13 is retracted, although the spool can rotate in the direction of retracting the seatbelt, it can not rotate in the extracting direction.

FIGS. 6 to 10 are schematic views of a fourth locking mechanism according to the embodiment of the present invention. In FIGS. 6 to 10, numerals 13a, 15d, 15e, 17c, 18, 19, 19a, 19b, 19c, and 20 represent a solenoid guide part, a hole, a projection, a projection, a plunger spring, a retainer, a slotted hole, a slotted hole, a pin, and a ratchet spring, respectively.

Figure 6:
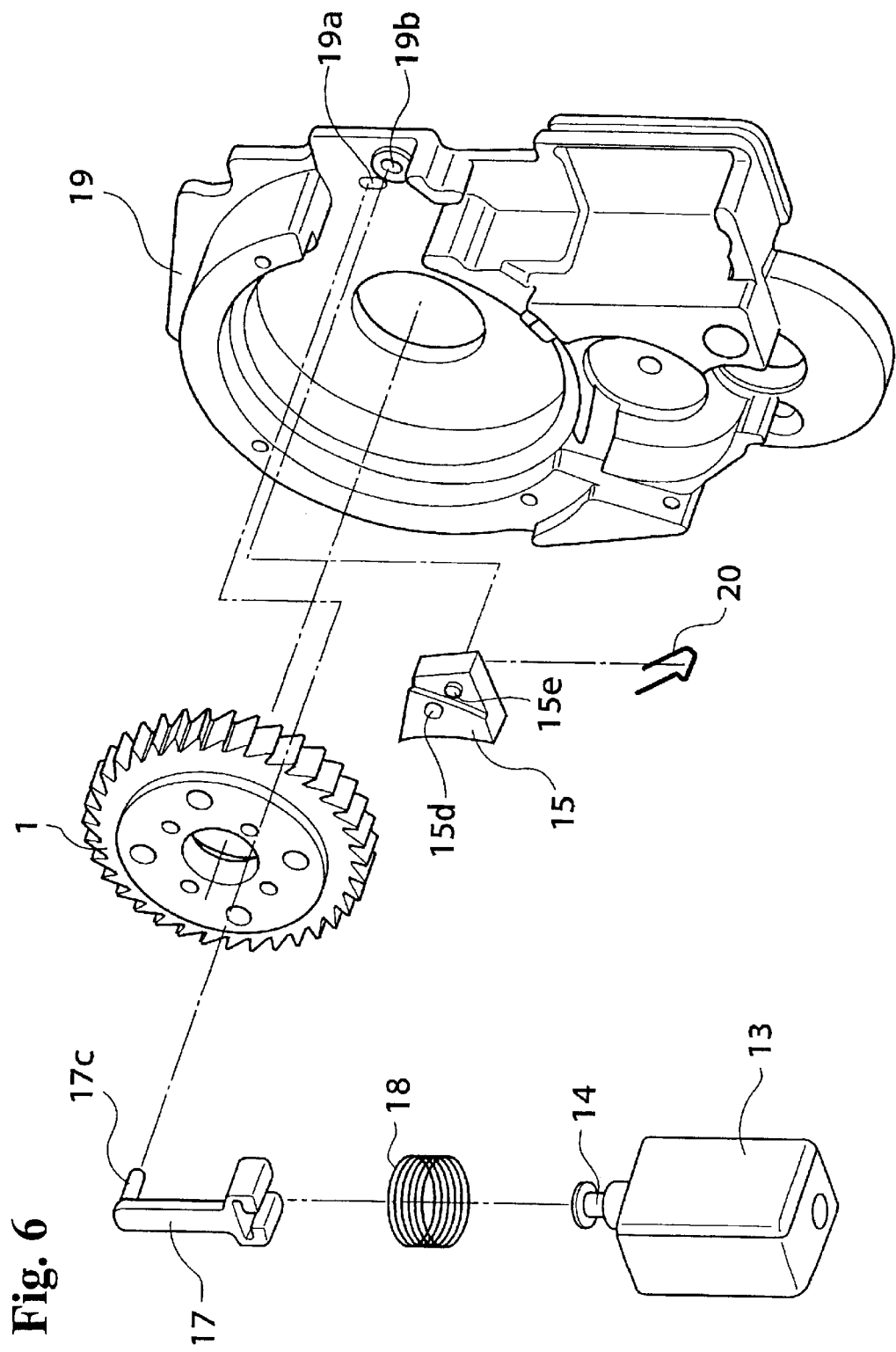
FIG. 6 is an assembly view of a fourth locking mechanism according to the embodiment of the present invention.

FIG. 6 is an assembly view showing an essential part of the locking mechanism. The piston 14 of the solenoid 13 engages the ratchet lever 17 which is upwardly raised as viewed in the drawing by extension of the piston 14 due to a function of the plunger spring 18 when the solenoid 13 is not exited. The projection 17c formed in the ratchet lever 17 passes through the hole 15d of the pawl 15 so as to fit into the slotted hole 19a of the retainer 19.

As shown in FIGS. 7(A) to 10, one end of the ratchet spring 20 is fixed to the retainer 19 and the other end contacts the projection 15e of the pawl 15 so as to urge the pawl 15 by the elastic force of the ratchet spring 20 in the direction of meshing with the ratchet gear 1 by using the projection 17c of the ratchet lever 17 as a rotational shaft. In addition, although not shown in the drawings, the projection 15e is also arranged in the backside of the pawl 15 at the same position so as to fit into the slotted hole 19b of the retainer 19.

Operation of the locking mechanism of such a structure will be described below with reference to FIGS. 7(A) to 10.

Figure 7A:
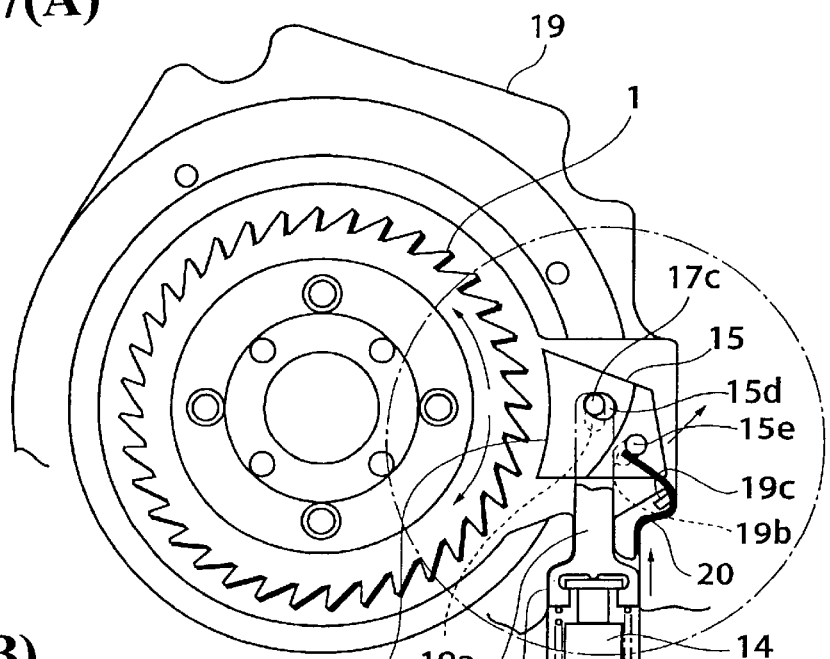
FIGS. 7(A) and 7(B) are schematic views illustrating a steady state of the locking mechanism shown in FIG. 6.
Figure 7B:
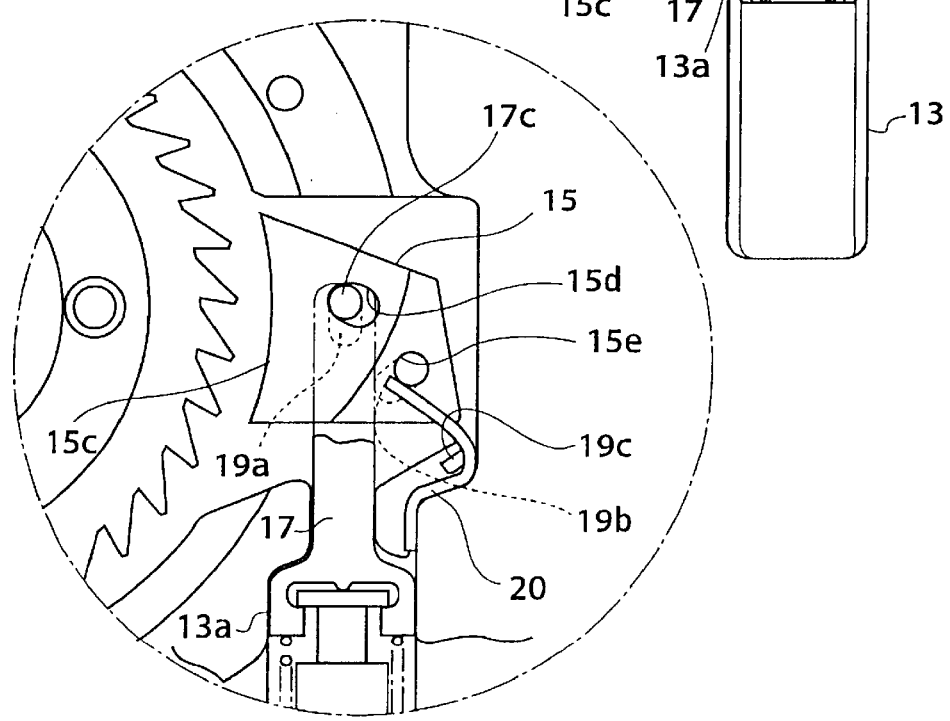

FIGS. 7(A) and 7(B) show a steady state in which the solenoid 13 is not excited. At this time, the piston 14 is extended by the urging force of the plunger spring 18, so that the ratchet lever 17 is located at the upper end of the guide part 13a. At this time, the projection 17c abuts against the upper end of the slotted hole 19a. The ratchet spring 20, which is fixed to the retainer 19 at one end, abuts against the projection 15e of the pawl 15 via the pin 19c formed in the retainer 19 so as to rotate the pawl 15 counterclockwise, as viewed in the drawing, by using the projection 17c as a rotational shaft. Therefore, in a state that the projection 15e on the backside of the pawl 15 abuts against the upper right end of the slotted hole 19b of the retainer 19, the pawl 15 stops rotation so as to be positioned at that position.

However, the engagement part 15c of the pawl 15 is separated from the teeth of the ratchet gear 1 in this state. Since the spool is not prevented from rotation, the ratchet gear 1 can rotate freely.

Figure 8:
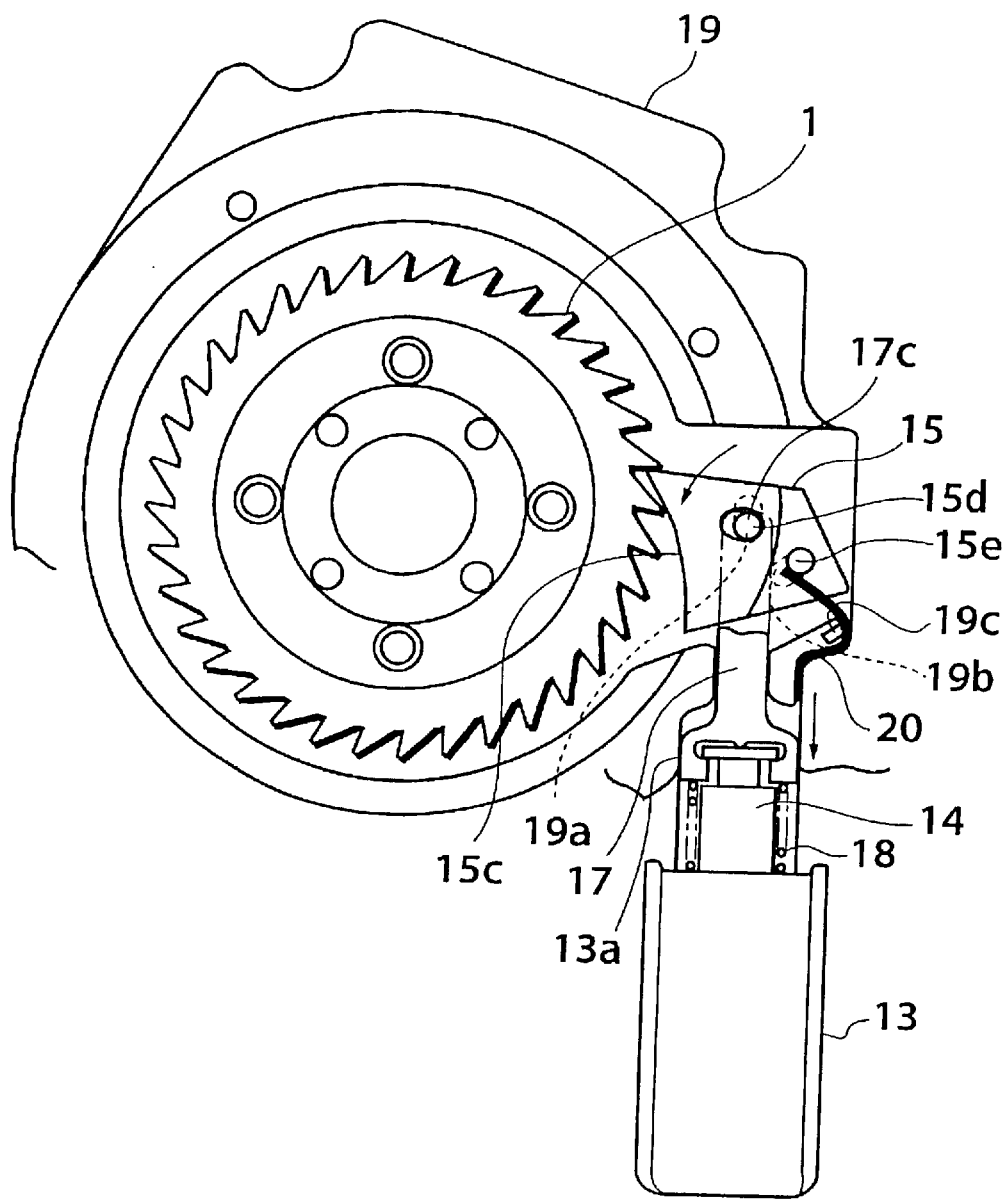
FIG. 8 is a schematic view illustrating a locking operation state of the locking mechanism shown in FIG. 6.

FIG. 8 shows a change from the state shown in FIG. 7(A) to a state in which the solenoid 13 is exited. At this time, the piston 14 is retracted against the urging force of the plunger spring 18, and therefore, the ratchet lever 17 is lowered along the guide part 13a. Then, the projection 17c is brought into contact with the lower end of the slotted hole 19a and stops at the position. At this time, because the projection 17c passes through the hole 15d, the position of the pawl 15 is lowered. At this time, the pawl 15 is rotated counterclockwise further from the position shown in FIG. 7(A) around the projection 15e abutting against the upper right end of the slotted hole 19b due to the urging force of the ratchet spring 20. Therefore, the tip of the engagement part 15c is moved to a position meshing with the teeth of the ratchet gear 1, as shown in the drawing.

Figure 9:
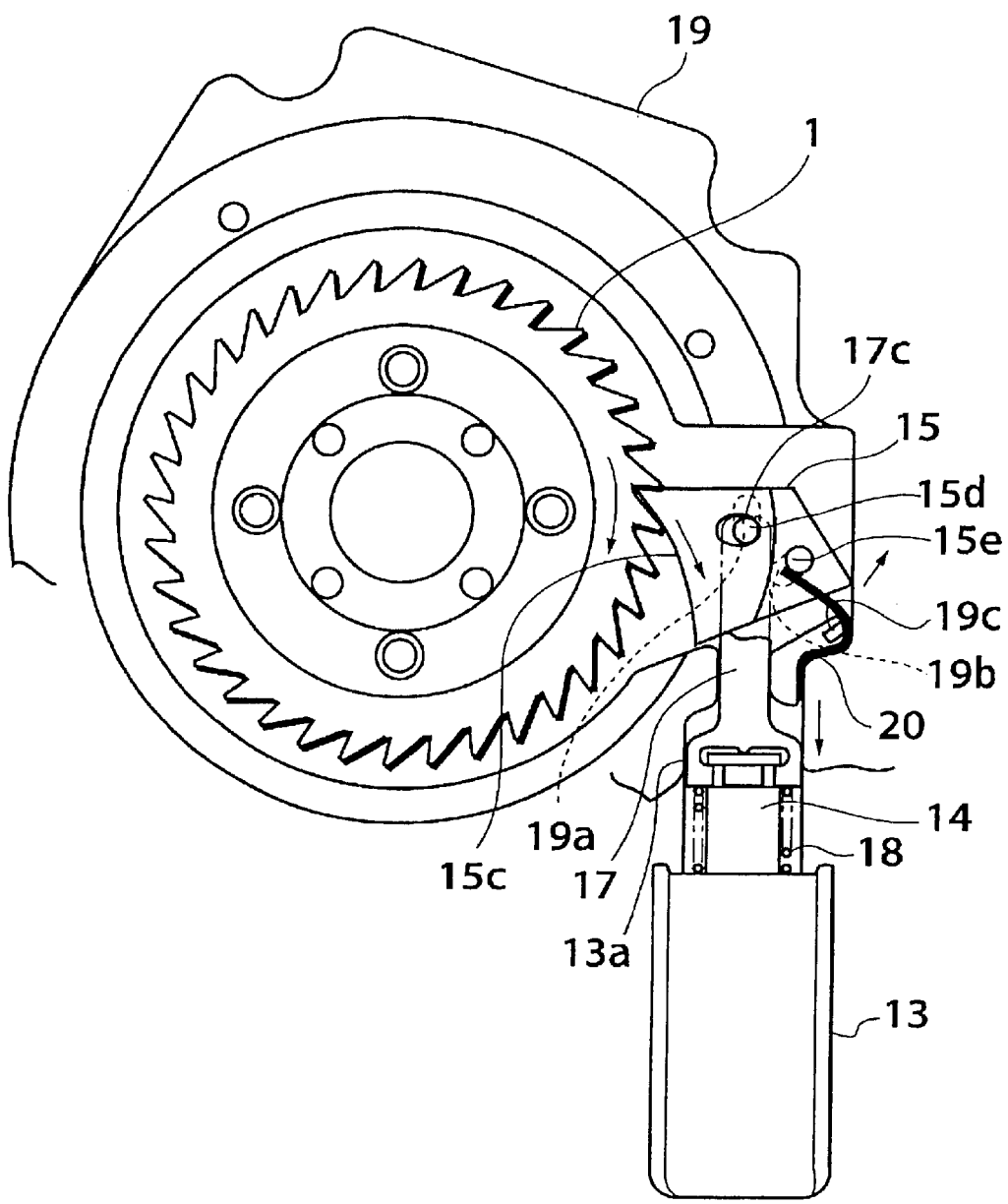
FIG. 9 is a schematic view illustrating a state that a spool is prevented from rotation in the seatbelt-extraction direction in the locking operation state of the locking mechanism shown in FIG. 6.

FIG. 9 shows a state when the spool rotates in the direction extracting the seatbelt in the state shown in FIG. 8. At this time, the ratchet gear 1 rotates clockwise as shown in the drawing. Then, the teeth thereof are brought into engagement with the engagement part 15c of the pawl 15. Therefore, the pawl 15 tries to rotate counterclockwise as indicated by an arrow in the drawing using the projection 17c as the center. However, it can not rotate because the projection 15e is restricted by the end of the slotted hole 19b, thereby stopping the rotation of the ratchet gear 1. Accordingly, the spool can not rotate in the direction of extracting the seatbelt.

Figure 10:
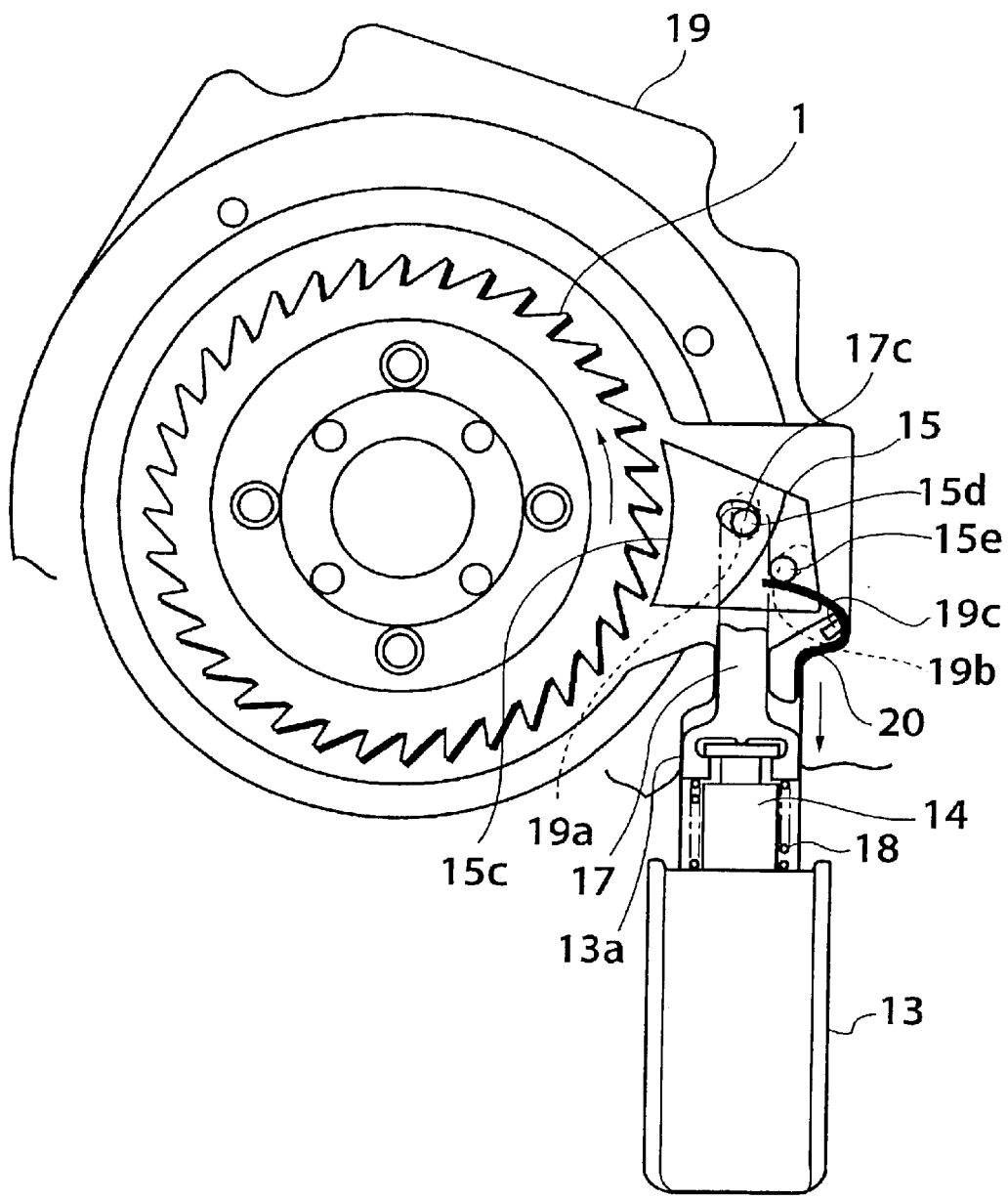
FIG. 10 is a schematic view illustrating a state that the spool is allowed to rotate in the seatbelt-retraction direction in the locking operation state of the locking mechanism shown in FIG. 6.

FIG. 10 shows a state when the spool rotates in the direction of retracting the seatbelt in the state shown in FIG. 8. At this time, the ratchet gear 1 rotates counterclockwise as shown in the drawing. Then, the engagement part 15c of the pawl 15 is pushed by the teeth of the ratchet gear so as to rotate clockwise about the projection 17c. This rotation is performed against the urging force of the ratchet spring 20. As a result, the projection 15e on the backside of the pawl 15 can move to the lower left end of the slotted hole 19b.

In such a manner, the pawl 15 allows the ratchet gear 1 to rotate by passing over the gear in a state that the engagement part 15c thereof touches the teeth of the ratchet gear 1 by the urging force of the ratchet spring 20. When the spool tries to rotate in the extracting direction from the state shown in FIG. 10, since the engagement part 15c contacts the teeth of the ratchet gear 1, the rotation of the spool is prevented by immediately turning to the state shown in FIG. 9.

As described above, when the solenoid 13 is not excited, the spool can rotate freely. When the solenoid 13 is excited, the spool can rotate in the direction of retracting the seatbelt, while it can not rotate in the extracting or withdrawing direction.

A fifth locking mechanism according to the embodiment of the present invention will be described below with reference to FIG. 11 again. The embodiment utilizes "a locking mechanism by a webbing sensor" described in the description of the related art.

That is, when a collision predicting signal is generated from a collision predicting device, the lock gear 25 is forcibly and rapidly driven in the direction of retracting the seatbelt by a newly attached motor (not shown). Then, the relative relationship between the lock gear 25 and the locking base 24 is turned to the same state as that the seatbelt is rapidly extracted. Thus, the pawl 32 is protruded outside, and the gear of the pawl 32 is brought into engagement with the gear section 28a formed in the base frame 28, thereby also stopping the rotation of the locking base 24.

In seatbelt retractors, there is a device having a function that when a collision, etc., occurs, the seatbelt is forcibly retracted so as to strongly restrain an occupant by operating a pretensioner. Also, there is a case where an airbag is simultaneously deployed while operating the pretensioner. When the collision predicting device sends a collision predicting signal to these devices, there is a lag of about 10 ms behind the starting of the collision diagnosis.

Therefore, when applying these devices to the present invention, a collision predicting signal is divided into two stages, prior to providing a collision predicting signal for operating the airbag and pretensioner. The locking mechanism according to the present invention may be operated in a state that there is some collision possibility but it is determined to be low in possibility for operating the airbag and pretensioner. After that, when it is determined in the final diagnosis that there is no collision possibility, the locking may be released.

Even when the locking signal is sent at the same timing as operating the pretensioner, the operation of the pretensioner is not disturbed, so that extracting the seatbelt can be of course locked after the operation of the pretensioner. In a conventional locking mechanism using a flywheel, it takes 20 to 40 ms before the locking extraction after a collision occurs. However, according to the present invention, the locking may be performed prior to occurrence of a collision.

As described above, according to the present invention, extraction of the seatbelt can be locked prior to the actual extraction of the seatbelt, resulting in establishing a safer seatbelt system. The seatbelt system also can not provide to an occupant uncomfortable feeling or unpleasantness due to locking produced when the seatbelt is extracted for wearing the seatbelt.

While the invention has been explained with reference to the specific embodiments of the invention, the explanation is illustrative and the invention is limited only by the appended claims.

What is claimed is:

1. A seatbelt retractor comprising:
   a retracting device having a spool for allowing a seat belt to withdraw from and retract onto the spool,
   a collision predicting device for predicting a collision, and
   a locking mechanism associated with the collision predicting device and the retracting device, and formed independently from a movement of the spool, said locking mechanism having means for locking a rotation of the spool in a seatbelt extracting direction upon receiving a collision predicting signal from the collision predicting device and means for allowing the spool to rotate in a seatbelt retracting direction in a condition that said means for locking the rotation of the spool operates and locks the spool.

2. A seatbelt retractor according to claim 1, wherein said retracting device further includes a rotational shaft connected to the spool; and the locking mechanism includes a ratchet gear having saw-blade teeth for use in a ratchet mechanism at an outer periphery thereof and engaging the rotational shaft, a pawl arranged to be engageable with the saw-blade teeth, and a driving mechanism for moving the pawl to engage one of the saw-blade teeth.

3. A seatbelt retractor according to claim 2, wherein said driving mechanism is a motor; and said lock mechanism further includes a lever connected to the pawl for driving the pawl to engage with and disengage from the saw-blade teeth, and a rotational body connected to the motor and slidably engaging the lever to operate as a torque limiter.

4. A seatbelt retractor according to claim 2, wherein said driving mechanism is a motor having a torque limiter; and said lock mechanism further includes a lever for driving the pawl to engage with and disengage from the saw-blade teeth, and a rotational body connected to the lever for driving the same and actuated by the motor.

5. A seatbelt retractor according to claim 2, wherein said seatbelt retractor further includes a rotational pin arranged in a fixed part of the seatbelt retractor; and said pawl is arranged to rotate about the rotational pin to be engageable with the saw-blade teeth, said driving mechanism driving the pawl so as to engage with and disengage from the saw-blade teeth.

6. A seatbelt retractor according to claim 5, wherein said lock mechanism further includes an elastic body situated between the driving mechanism and the pawl.

7. A seatbelt retractor according to claim 1, further comprising a mechanism for locking extraction of the seatbelt by detecting rapid extraction of the seatbelt, wherein the mechanism for locking rotation in the extracting direction of the seatbelt retractor is a mechanism for actuating the locking mechanism by a webbing sensor.

8. A seatbelt retractor according to claim 1, wherein said locking mechanism includes a ratchet gear having saw-blade teeth on an outer periphery thereof and connected to the spool, a pawl arranged to be engageable with the saw-blade teeth, and a driving mechanism for moving the pawl to engage one of the saw-blade teeth, said driving mechanism being attached to the pawl for allowing the pawl to move away from the saw-blade teeth when the ratchet gear rotates in the seatbelt retracting direction in the condition that the pawl engages one of the saw-blade teeth to prevent the spool to rotate in the seatbelt extracting direction.

9. A seatbelt retractor according to claim 8, further comprising an elastic body attached to the pawl as said means for allowing the spool to rotate in the seatbelt retracting direction, said elastic body allowing the pawl to move away from the saw-blade teeth when the ratchet gear rotates in the seatbelt retracting direction in the condition that the pawl engages one of the saw-blade teeth.

10. A seatbelt retractor comprising:
    a fixed part having first and second elongated holes,
    a retracting device having a spool for allowing a seat belt to withdraw from and retract onto the spool and a rotational shaft connected to the spool,
    a collision predicting device for predicting a collision, and
    a locking mechanism associated with the collision predicting device and the retracting device and formed independently from a movement of the spool, said locking mechanism locking a rotation of the spool in a seatbelt extracting direction upon receiving a collision predicting signal from the collision predicting device and including a ratchet gear having saw-blade teeth for use in a ratchet mechanism at an outer periphery thereof and engaging the rotational shaft, a pawl arranged to be engageable with the saw-blade teeth and having a pin fitted in the first slotted hole and a hole, a driving mechanism for moving the pawl to engage one of the saw-blade teeth, and a ratchet lever connected to the driving mechanism as a reciprocation driving unit and having a rotational pivot situated in the second elongated hole through the hole of the pawl,
    wherein when the reciprocation driving unit is located at a first position, the rotational pivot of the ratchet lever is located at one end of the second elongated hole to allow the pawl to be positioned apart from the ratchet gear, and
    wherein when the reciprocation driving unit is located at a second position, the rotational pivot of the ratchet lever is located at an engageable position with the ratchet gear, and in this condition when the spool is rotated in a webbing extracting direction, the pawl rotates about the rotational pivot and the pin is located at one end of the first elongated hole to stop rotation of the ratchet gear, and when the spool is rotated in a webbing retracting direction, the pawl rotates about the rotational pivot in an opposite direction and the pin is located at the other end of the first elongated hole so that the rotation of the ratchet gear is allowed.

11. A seatbelt retractor according to claim 10, further comprising an elastic body for urging the pawl to engage the ratchet gear.

* * * * *